United States Patent
Honma

(10) Patent No.: US 8,879,096 B2
(45) Date of Patent: Nov. 4, 2014

(54) INFORMATION PROCESSING DEVICE, IMAGE OUTPUT SYSTEM, NON-TRANSITORY COMPUTER-READABLE RECORDING MEDIUM, AND IMAGE OUTPUT ASSISTING DEVICE FOR IMAGE OUTPUT SYSTEM

(75) Inventor: Tomoyuki Honma, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 14 days.

(21) Appl. No.: 13/314,598

(22) Filed: Dec. 8, 2011

(65) Prior Publication Data

US 2012/0147422 A1 Jun. 14, 2012

(30) Foreign Application Priority Data

Dec. 13, 2010 (JP) ................................. 2010-277336

(51) Int. Cl.
G06F 3/12 (2006.01)

(52) U.S. Cl.
USPC .......... 358/1.15; 358/1.9; 358/1.14; 358/1.13

(58) Field of Classification Search
CPC ...... G06F 3/1228; G06F 3/126; G06F 3/1247
USPC ................ 358/1.13–1.16, 1.9–1.18
See application file for complete search history.

(56) References Cited

U.S. PATENT DOCUMENTS

| | | | |
|---|---|---|---|
| 5,287,194 A | 2/1994 | Lobiondo | |
| 6,213,652 B1 * | 4/2001 | Suzuki et al. | 358/1.15 |
| 7,096,208 B2 | 8/2006 | Zaragoza et al. | |
| 7,096,280 B2 * | 8/2006 | Aoki et al. | 709/246 |
| 7,171,682 B2 * | 1/2007 | Katada et al. | 726/11 |
| 7,312,887 B2 | 12/2007 | Wu | |
| 8,171,190 B2 | 5/2012 | Byun et al. | |

(Continued)

FOREIGN PATENT DOCUMENTS

| | | |
|---|---|---|
| JP | 06-274292 | 9/1994 |
| JP | 11-134142 | 5/1999 |

(Continued)

OTHER PUBLICATIONS

Non-Final Office Action dated Aug. 5, 2013 for U.S. Appl. No. 13/372,999.
Final Office Action dated Feb. 21, 2014 in U.S. Appl. No. 13/372,999.
Advisory Action Issued by the USPTO on Jun. 11, 2014 in U.S. Appl. No. 13/372,999.

(Continued)

Primary Examiner — Dennis Dicker
(74) Attorney, Agent, or Firm — Edwards Wildman Palmer LLP; David G. Conlin; David J. Silvia

(57) ABSTRACT

An information processing device includes: a data generating section for generating compatible format data of data that is generated on the basis of an application program; a searching section for searching, when the data generating section is instructed to generate the compatible format data, for at least one image output device connected to a network and capable of printing out the compatible format data; a disclosing section for disclosing to the user the at least one image output device, which has been searched; a receiving section for receiving (i) a selection of an image output device to which the compatible format data is transmitted, (ii) input of a condition for printing, and (iii) an instruction for execution; and a command generating section for generating a command for causing the printing to be executed in accordance with a received condition for the printing.

4 Claims, 11 Drawing Sheets

(56) References Cited

U.S. PATENT DOCUMENTS

| | | |
|---|---|---|
| 2002/0030840 A1* | 3/2002 | Itaki et al. .................... 358/1.13 |
| 2002/0030852 A1 | 3/2002 | Matsuo |
| 2002/0097408 A1* | 7/2002 | Chang et al. .................... 358/1.6 |
| 2002/0105671 A1 | 8/2002 | Sugahara |
| 2003/0197887 A1* | 10/2003 | Shenoy et al. ............... 358/1.15 |
| 2003/0231331 A1* | 12/2003 | Tanaka ......................... 358/1.13 |
| 2004/0130744 A1 | 7/2004 | Wu et al. |
| 2006/0074840 A1 | 4/2006 | Gava et al. |
| 2006/0114509 A1* | 6/2006 | Itaki et al. .................... 358/1.15 |
| 2006/0132845 A1* | 6/2006 | Itaki et al. .................... 358/1.15 |
| 2006/0279775 A1 | 12/2006 | Matsumoto et al. |
| 2007/0177192 A1* | 8/2007 | Wang ........................... 358/1.15 |
| 2007/0268517 A1 | 11/2007 | Koarai |
| 2008/0306902 A1 | 12/2008 | Gava et al. |
| 2009/0033976 A1* | 2/2009 | Ding ............................ 358/1.15 |
| 2010/0149570 A1 | 6/2010 | Kamiya et al. |
| 2010/0235216 A1 | 9/2010 | Hehmeyer et al. |

FOREIGN PATENT DOCUMENTS

| | | |
|---|---|---|
| JP | 11-331455 A | 11/1999 |
| JP | 2000-358114 A | 12/2000 |
| JP | 2001-156976 A | 6/2001 |
| JP | 2002-091732 A | 3/2002 |
| JP | 2002-328795 A | 11/2002 |
| JP | 2004-213656 A | 7/2004 |
| JP | 2006-163993 A | 6/2006 |
| JP | 2006-243998 A | 9/2006 |
| JP | 2007-095034 A | 4/2007 |
| JP | 2007-256991 A | 10/2007 |
| JP | 2007-282136 A | 10/2007 |
| JP | 2008-028719 A | 2/2008 |
| JP | 2008-234111 A | 10/2008 |

OTHER PUBLICATIONS

First Office Action dated Aug. 22, 2014 for co-pending U.S. Appl. No. 14/310,271.

* cited by examiner

| NAME | IP ADDRESS | SUPPORTED FUNCTION |
|---|---|---|
| SHARP MX-2310F | 192.168.11.2 | PRINTING<br>E-MAIL TRANSMISSION |
| SHARP MX-3100FG | 192.168.11.3 | PRINTING<br>FACSIMILE TRANSMISSION<br>E-MAIL TRANSMISSION |
| SHARP MX-M503N | 192.168.11.4 | PRINTING |

FIG. 9

(a) IN A CASE OF PRINTING

| Print Settings | |
|---|---|
| Number of Copies | 1 |
| Double-side Printing | Single-side Printing |
| Multi-shot Printing | 2-Up |
| Color Mode | Color |

OK    Cancel (b) IN A CASE OF FACSIMILE TRANSMISSION

| Facsimile Transmission Settings | |
|---|---|
| Facsimile Number | xxxx-xx-xxxx |
| Communication Speed | 33.6 kbps |

OK    Cancel (c) IN A CASE OF E-MAIL TRANSMISSION

| E-mail Transmission Settings | |
|---|---|
| E-mail Address | aaa@sharp.co.jp |
| File Format | PDF |
| Color Mode | Color |
| Compression Format | Medium Level Compression |

OK    Cancel (d) IN A CASE OF INTERNET FACSIMILE TRANSMISSION

| Internet Facsimile Transmission Settings | |
|---|---|
| E-mail Address | aaa@sharp.co.jp |
| Compression Format | MMR |
| Request for Transmittal Confirmation | YES |

OK    Cancel

| Print Settings | |
|---|---|
| Number of Copies | 1 |
| Double-side Printing | Single-side Printing ▼ |
| Multi-shot Printing | 2 in 1 ▼ |
| Color Mode | Color ▼ |

OK   Cancel (b)

| Print Settings | |
|---|---|
| Number of Copies | 1 |
| Double-side Printing | Single-side Printing ▼ |
| Multi-shot Printing | Single-side Printing |
|  | Double-side Printing (Side-stapled) |
| Color Mode | Double-side Printing (Top-stapled) |

OK   Cancel

FIG. 11

(a)  IN A CASE OF PRINTING

```
TYPE=PRINT
COPIES=1
DUPLEX=SIMPLEX
NUP=2
ORIENTATION=PORTRAIT
COLORMODE=COLOR
// COMPATIBLE FORMAT
```

(b)  IN A CASE OF FACSIMILE TRANSMISSION

```
TYPE=FAX
FAXNUMBER=xxxx-xx-xxxx
SPEED=336000
// COMPATIBLE FORMAT
```

(c)  IN A CASE OF E-MAIL TRANSMISSION

```
TYPE=MAIL
MAILADDRESS=aaa@sharp.co.jp
FILETYPE=PDF
COLORMODE=COLOR
COMPRESSION=MIDDLE
// COMPATIBLE FORMAT
```

(d)  IN A CASE OF INTERNET FACSIMILE TRANSMISSION

```
TYPE=IFAX
MAILADDRESS=aaa@sharp.co.jp
COMPRESSION=MMR
RECEPTION=ON
// COMPATIBLE FORMAT
```

INFORMATION PROCESSING DEVICE, IMAGE OUTPUT SYSTEM, NON-TRANSITORY COMPUTER-READABLE RECORDING MEDIUM, AND IMAGE OUTPUT ASSISTING DEVICE FOR IMAGE OUTPUT SYSTEM

This Nonprovisional application claims priority under 35 U.S.C. §119(a) on Patent Application No. 2010-277336 filed in Japan on Dec. 13, 2010, the entire contents of which are hereby incorporated by reference.

TECHNICAL FIELD

The present invention relates to an information processing device, an image output assisting device, and the like which assist output of an image in an image output system in which (i) application data is converted, so as to be used, into dada in a form of a compatible format file for printing.

BACKGROUND ART

In recent years, with spread of an information processing device (personal computer), an image output device, which carries out an output process of an image data transmitted from the information processing device, has come into increasing use. Examples of the image output device encompasses (i) a printer equipped only with a printing function, (ii) a multifunction printer which is equipped with, in addition to the printing function, a data transmission function such as a scanning function, a facsimile transmission function, and an e-mail transmission function, and (iii) an MFP (multifunction peripheral).

The image output device, in many cases, is connected to a network such as a LAN. At an office or the like, a plurality of image output devices are provided at a plurality of places. A user selects an image output device to use, out of the plurality of image output devices, in consideration of locations of the plurality of image output devices and a function(s) of each of the plurality of image output devices.

Recently, we see in town more and more places like an Internet café, in which a network is provided via which a user can connect to the Internet. The user brings his own information processing device, such as a mobile PC, to such an environment, so that he can connect to the Internet even when he is outside his home.

Note that, to print out an image data by use of an image output device A connected to a network, it is necessary that a printer driver for the image output device A be installed on an information processing device from which to transmit the image data. Likewise, to print out the image data by use of another image output device B connected to the network (the image output devices A and B differ in models), it is necessary that a printer driver for the image output device B be installed on the information processing device.

That is, in order to use a plurality of image output devices connected to a network, it is necessary that printer drivers for the respective plurality of image output devices be installed on an information processing device from which to transmit image data.

As such, every time an image output device is newly provided in an environment like the early-described office where a plurality of image output devices have been provided, an IT administrator who is in charge of an information processing device and the plurality of image output devices contacts a user of the information processing device, which is under the supervision of the IT administrator, so as to have the user install a printer driver for the image output device, which has been newly provided.

However, the user of the information processing device might not bother to install the printer driver even if he wants to use the image output device, which has been newly provided. In such a case, the user does not know the presence of such an image output device, let alone its functions.

In a case of using an image output device C provided in an environment like an Internet café, it is necessary that the user use the image output device C by temporarily transferring image data from the user's own information processing device to a USB memory or the like and then inserting the USB memory into an information processing device which is provided in the environment and on which a printer driver for the image output device C has been installed.

However, in a case where the image data to be printed out is highly confidential, many users hesitate to print out the image data via another information processing device. There is accordingly a demand for a way to print out image data by transferring the image data directly from the user's own information processing device.

Patent Literature 1 describes a technique of converting application data, which has been created on the basis of a given application program, into data in a form of a compatible format file for printing (hereinafter referred to as 'compatible format data'), for example, data in a form of a Portable Document Format (PDF) file.

Conversion of the application data into the compatible format data allows a user of an information processing device to print out the compatible format data via any image output device capable of printing out the compatible format data, even if a printer driver for the image output device has not been installed on the information processing device.

This eliminates (i) the need for the IT administrator to have the user of the information processing device to install the printer driver and (ii) the need for the user to install the printer driver. It also becomes possible for a user to have image data printed out from an image output device, provided in the environment like an Internet café, by directly transmitting the image data from the user's own information processing device to the image output device.

CITATION LIST

Patent Literature

Patent Literature 1
Japanese Patent Application Publication, Tokukai, No. 2002-328795 A (Publication Date: Nov. 15, 2002)

SUMMARY OF INVENTION

Technical Problem

Conversion of application data into compatible format data allows a user to use any image output device that is on a network and capable of printing out the compatible format data, even if the user has not installed a printer driver for the image output device. This significantly increases image output devices that can be used.

For example, a user who carries his information processing device with him can easily carry out printing by use of an image output device provided at an Internet café, a convenience store, a conference facility, an accommodation facility, and the like in town.

However, even if image output devices that can be used are increased, a user of the information processing device cannot even know whether there is an image output device available nearby when he is out in town. That is, even though use of the compatible format data can significantly increase image output devices that can be used, there has not been an assisting system established for allowing the user to make efficient use of the image output devices.

This also applies to the office where the plurality of image output devices are provided. Even if the user understands that conversion of application data into compatible format data allows him to use even an image output device whose printer driver has not been installed, he cannot know whether or not such an image output device is present. This inevitably prohibits the user from making efficient use of the image output device, even if use of the image output device without installing its printer driver has been made possible.

The present invention is accomplished in view of the problem. An object of the present invention is to provide: an information processing device for assisting a user to make efficient use of an image output system, in which conversion of application data into compatible format data allows the application data to be printed out by even an image output device whose printer driver has not been installed; an image output assisting device for the image output system; and the image output system.

Solution to Problem

In order to attain the object, an information processing device in accordance with the present invention is an information processing device including: a data generating section for generating compatible format data of application data that is generated on the basis of an application program; a searching section for searching, when the data generating section is instructed to generate the compatible format data, for at least one image output device connected to a network and capable of printing out the compatible format data; disclosing section for disclosing the at least one image output device, which has been searched by the searching section; a receiving section for receiving (i) a selection of an image output device, out of the at least one image output device, to which the compatible format data is transmitted, (ii) input of a condition for printing, and (iii) an instruction for execution; and a command generating section for generating, when the receiving section receives the instruction for execution, a command for causing the printing to be executed in accordance with a received condition for the printing.

According to the configuration, when the data generating section is instructed to generate the compatible format data of the application data, the searching section searches for the at least one image output device connected to the network and capable of printing out the compatible format data. The disclosing section discloses a result of search carried out by the searching section.

Then, the receiving section receives (i) the selection of an image output device to which the compatible format data is to be transmitted, (ii) the input of the condition for printing, and (iii) the instruction for execution. The command generating section generates the command in accordance with the instruction and the like received by the receiving section. A generated command is added to the compatible format data. The compatible format data, to which the command has been added, is transmitted to the selected image output device. This causes printing of the compatible format data to be executed.

That is, according to the configuration, when the user wants to print out application data, a mere instruction from the user to convert the application data into the compatible format data causes the image output devices, which are located close to the user and capable of printing out the compatible format data, to be detected through search and disclosed to the user. As such, just by (i) selecting the image output device to use, out of the image output devices, on the basis of displayed information, (ii) inputting conditions for printing, and (iii) giving an instruction to execute printing, the user can obtain a printed material of the compatible format data from the image output device, which is present near a location at which the user has given the instruction for printing.

This allows a user who carries the information processing device with him to (i) find out easily an image output device which is provided at an Internet café, a convenience store, a conference facility, an accommodation facility, or the like in town and (ii) cause the image output device to execute printing, even if he does not know presence of such an image output device.

In a case of a user at an office where a plurality of image output devices are provided, the user can (i) easily find out an image output device which has been newly provided and whose printer driver has not been installed and (ii) cause the image output device to execute printing, even if he does not know presence of such an image output device.

This makes it possible to provide an information processing device which can assist the image output system, in which conversion of application data into the compatible format data allows the compatible format data to be printed out by even an image output device whose printer driver has not been installed, so that the user can make efficient use of the image output system.

An image output system in accordance with the present invention includes (i) the information processing device in accordance with the present invention as described above and (ii) the image output device which is connected to the information processing device via the network and is capable of at least printing out the compatible format data.

As early described in the description of the configuration of the information processing device, the image output system including the information processing device in accordance with the present invention has a configuration in which the information processing device not only generates the compatible format data but also (i) finds out an image output device capable of printing out the compatible format data and (ii) informs the user of the information processing device. This allows the user to (a) select the image output device and input a condition for printing or (b) select an output process and input a condition for a selected output process and an instruction for execution. Thus, it becomes possible for the user to make more efficient use of the image output system, in which conversion of data into the compatible format data allows the compatible format data to be printed out by even an image output device whose printer driver has not been installed.

An image output assisting device for an image output system in device for use in an image output system in which an information processing device, which includes a data generating section for generating compatible format data of application data generated on the basis of an application program, transmits the compatible format data to an image output device which is connected to the information processing device via a network and is capable of at least printing out the compatible format data, said image output assisting device comprising: a searching section for searching, when the data generating section is instructed to generate the compatible format data, for at least one image output device connected to a network and capable of printing out the compatible format data; a disclosing section for disclosing the at least one image output device, which has been searched by the searching section; a receiving section for receiving (i) a selection of an image output device, out of the at least one image output device, to which the compatible format data is transmitted, (ii) input of a condition for printing, and (iii) an instruction for execution; and a command generating section for generating, when the receiving section receives the instruction for execution, a command for causing the printing to be executed in accordance with a received condition for the printing.

As early described in the description of the configuration of the information processing device, the image output assisting device in accordance with the present invention has a configuration in which the image output assisting device (i) finds out, in response to an instruction to generate the compatible format data, an image output device capable of printing out the compatible format data and (ii) informs the user of the information processing device. This allows the user to (a) select the image output device and input a condition for printing or (b) select an output process and input a condition for a selected output process and an instruction for execution. The image output assisting device thus assists image output in an image output system, in which conversion of application data into the compatible format data allows the compatible format data to be printed out by even an image output device whose printer driver has not been installed. As such, the image output assisting device makes it possible for the user to make efficient use of the image output system.

Advantageous Effects of Invention

According to the present invention, it becomes possible for the user to make more efficient use of an image output system, in which conversion of data into the compatible format data allows the compatible format data to be printed out by even an image output device whose printer driver has not been installed.

BRIEF DESCRIPTION OF DRAWINGS

FIG. 9 is an explanatory view showing setting windows for setting a process method, each of which setting windows is displayed when a user clicks a desired function in each of windows for selecting output process function illustrated in FIGS. 7 and 8. (a) of FIG. 9 shows a setting window for printing, (b) of FIG. 9 shows a setting window for facsimile transmission, (c) of FIG. 9 shows a setting window for e-mail transmission, and (d) of FIG. 9 shows a setting window for I-facsimile transmission.

FIG. 10 is an explanatory view illustrating other examples of a setting window for printing.

FIG. 11 is an explanatory view showing examples of commands to be generated by a command generating section in the information processing device. (a) of FIG. 11 shows commands for printing, (b) of FIG. 11 shows commands for facsimile transmission, (c) of FIG. 11 shows commands for e-mail transmission, and (d) of FIG. 11 shows commands for I-facsimile transmission.

DESCRIPTION OF EMBODIMENTS

Figure 2:
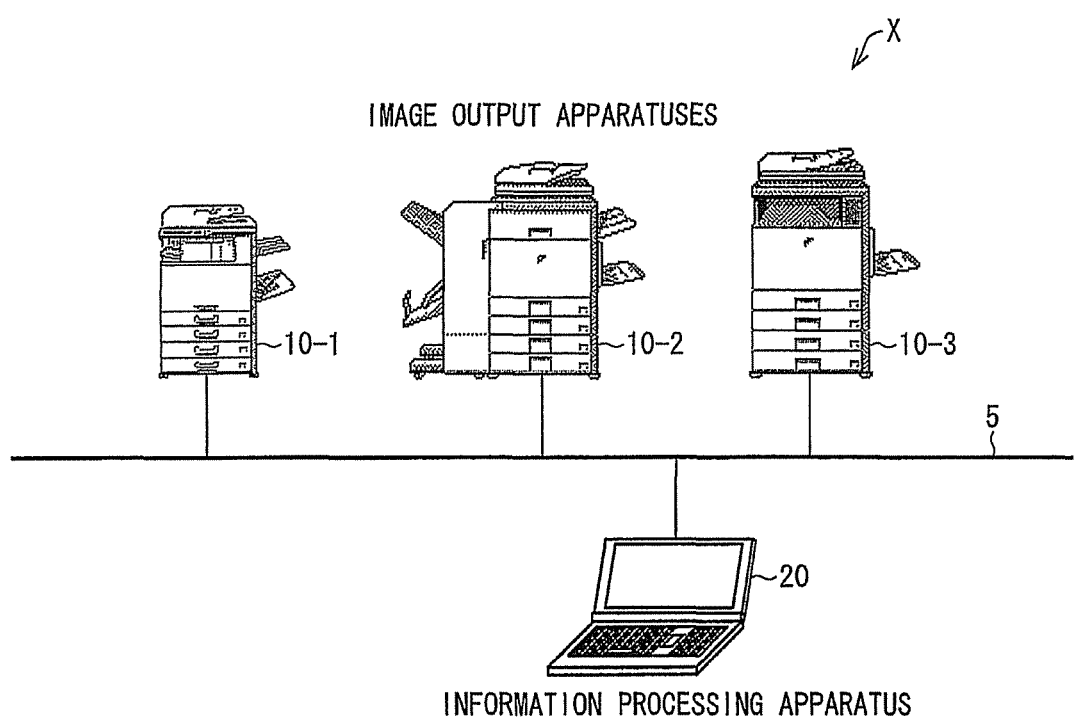
FIG. 2 is an explanatory view illustrating a configuration of an image output system image output in which is assisted by the information processing device.

As illustrated in FIG. 2, in an image output system X, an information processing device 20 in accordance with an embodiment of the present invention is connected with a plurality of image output devices 10-1 through 10-$n$ via an network 5, which is the Internet, an intranet or the like. The information processing device 20 assists image output in the image output system X.

The network 5 is an IP network or the like whose examples encompass an intranet/the Internet or the like such as a LAN, a wireless LAN, WiMAX, PLC, and c.link. The network 5 can be connected to an external network.

The plurality of image output devices 10-1 through 10-$n$ are each an image output device having at least a printing function. Examples of the plurality of image output devices 10-1 through 10-$n$ encompass a printer, a printer having a scanning function, a multifunction printer, and an MFP.

The information processing device 20 is an information processing device such as a PC/AT compatible machine and a Mac®-based machine. Alternatively, the information processing device 20 can be a terminal such as a mobile terminal such as a PDA. Instead of a single information processing device 20, a configuration can be employed that includes a plurality of information processing devices 20, each of which has the same configuration as the information processing device 20 and is connected to the network 5.

Figure 1:
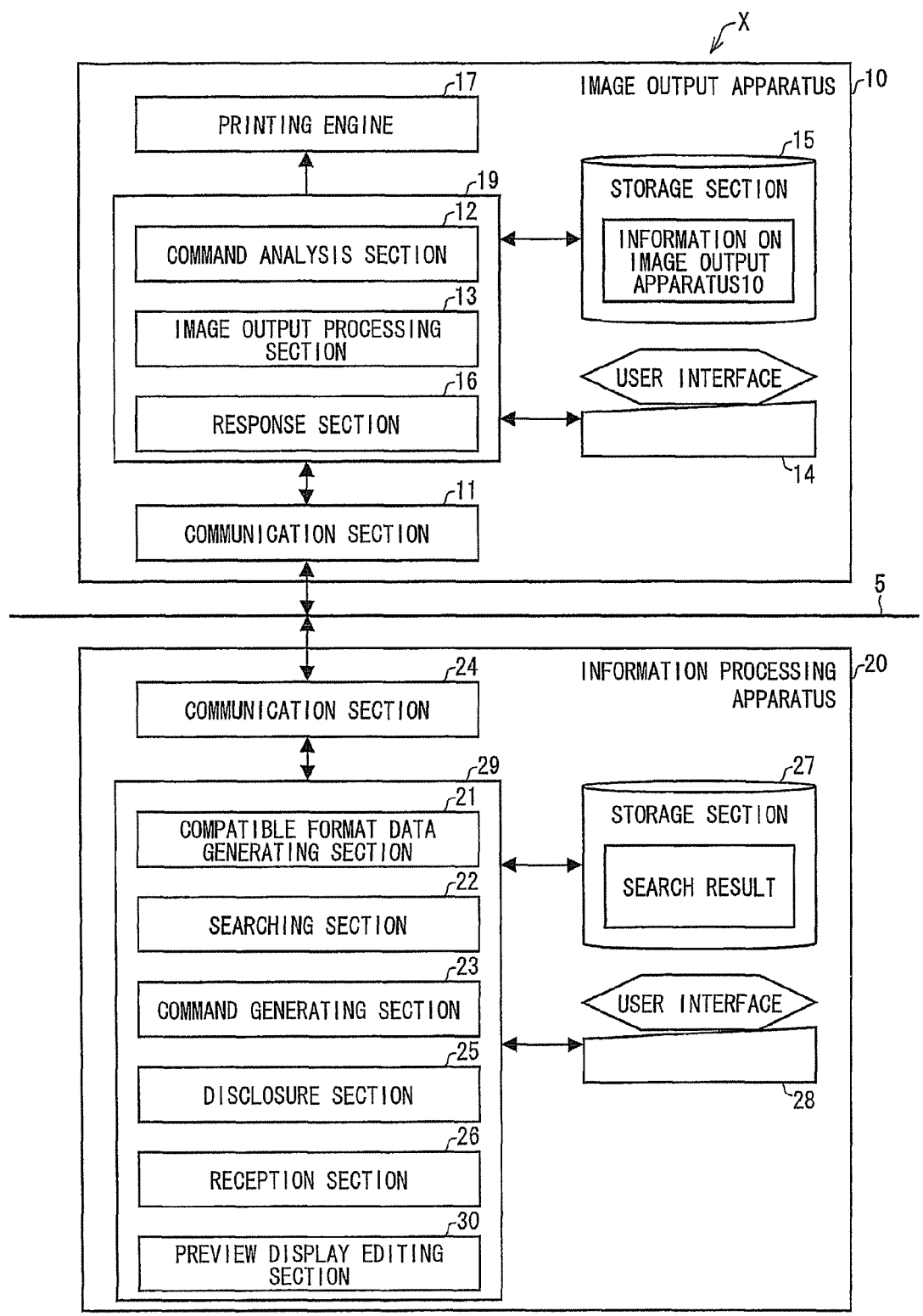
FIG. 1 shows an embodiment of the present invention and is a block diagram illustrating functions of an information processing device and functions of an image output device that carries out output process with respect to image data transmitted from the information processing device.

FIG. 1 is a functional block diagram of the information processing device 20 and the image output device 10. The following description will first discuss the information processing device 20.

The information processing device 20 includes a compatible format data generating section 21, a searching section 22, a command generating section 23, a communication section 24, a disclosure section 25, a reception section 26, a storage section 27, a user interface 28, and a preview display editing section 30.

The compatible format data generating section 21 generates compatible format data of application data in various formats such as a document, a spreadsheet document, a raster image, and a photograph, which application data are generated on the basis of various application programs (software). The compatible format data generating section 21 is a type of a printer driver and can be run at a time of carrying out printing in a given application. Examples of a compatible format that can be printed out by a given image output device encompass Portable Document Format (PDF), XML Paper Specification (XPS), and the like. In the present embodiment, the compatible format is exemplified as the PDF.

In response to the compatible format data generating section 21 starting generating the compatible format data, the searching section 22 searches, via the communication section 24, for the plurality of image output devices 10-1 through 10-N connected to the network 5 capable of printing out the compatible format data. Note that, in a more preferable configuration of the information processing device 20 of the present embodiment, the searching section 22 (i) also obtains information on a function(s) supported by the image output device 10 capable of printing out the compatible format and (ii) detects, as an output process function(s) other than printing, a function(s) in which the compatible format data can be used.

The searching section 22 carries out a search by use of, for example, Simple Network Management Protocol (SNMP) or WS-Discovery (WSD).

In the information processing device 20 of the present embodiment, the searching section 22 obtains information on (i) a name of the image output device 10 capable of processing the compatible format data, (ii) an IP address of the image output device 10, and (iii) an output process function(s), such as printing function, which is(are) supported by the image output device 10 and in which the compatible format data can be used.

The searching section 22 detects the output process function(s) in which the compatible format data can be used, on the basis of the information on (i) the name of a detected image output device 10 and (ii) the function(s), supported by the image output device 10, which has(have) been detected through the search. Examples of the output process function(s), other than the printing function, in which the compatible format data can be used encompasses facsimile transmission, I-facsimile transmission, e-mail transmission, and FTP transmission.

In a case where the image output device 10 is capable of e-mail transmission, the searching section 22 also obtains, as the information on supported function(s), information of weather or not the image output device 10 has a function of converting PDF data into JPEG data or TIFF data.

Figures 5, 6:
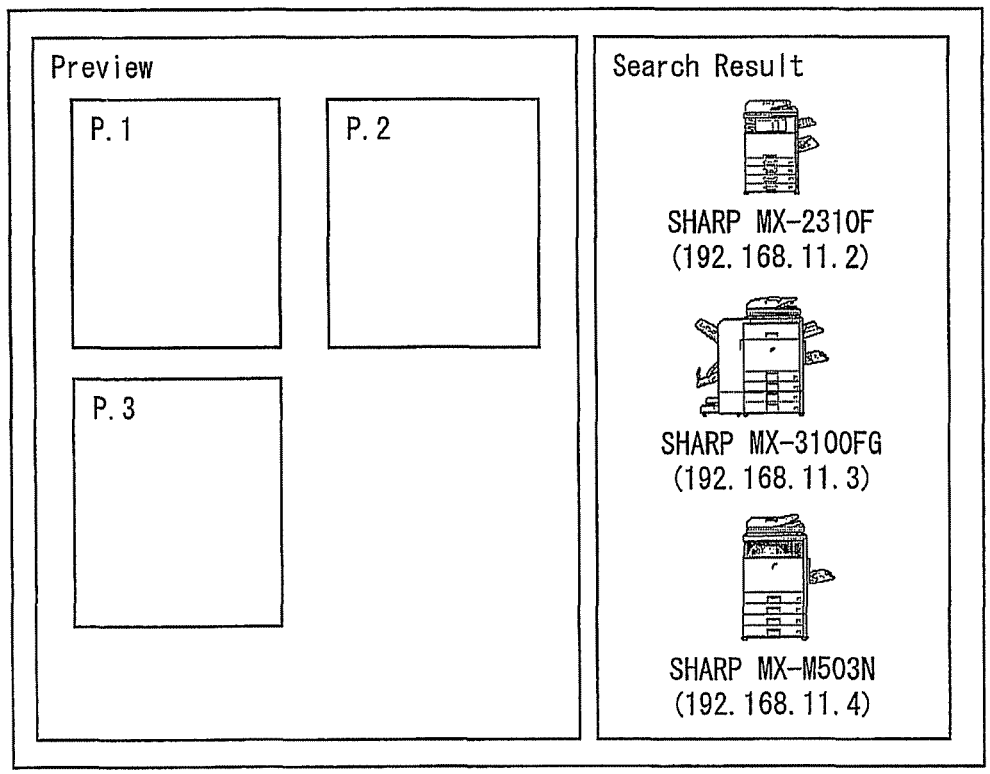
FIG. 5 is an explanatory view illustrating an example of a search result which is obtained as a result of search carried out by a searching section and is to be stored in a storage section in the information processing device.
FIG. 6 is an explanatory view illustrating an example of a preview display window and a display window of a search result, the preview display window and the display window being displayed after a button 'print' on the setting window for printing illustrated in FIG. 3 is clicked.

The storage section 27 is a memory such as an HDD and stores a result of search carried out by the searching section 22 (search result), namely, (i) information on the name, the IP address, and the like of the image output device 10 capable of printing out the compatible format data and (ii) information on the output process function(s), such as printing and data transmission, which is(are) supported by the image output device 10 capable of printing out the compatible format data and in which the compatible format data can be used (see FIG. 5).

The disclosure section 25 discloses, via the user interface 28, (i) the information on the image output device which is the image output device 10 capable of printing out the compatible format data and is detected through the search carried out by the searching section 22 and (ii) the information on the output process function(s), which is(are) supported by the image output device 10 and determined to be able to use the compatible format data. The disclosure section 25 discloses the information generally by displaying the information on a display window of the user interface 28. For a user with impaired vision, the disclosure section 25 can disclose the information by audio.

The reception section 26 receives from the user, via the user interface 28, (i) selection of the image output device 10 to be a destination to which the compatible format data is transmitted, (ii) selection of an output process to be used, (iii) input of a condition for a selected output process, and (iv) an instruction for execution.

The preview display editing section 30 creates a preview image of the compatible format data generated by the compatible format data generating section 21 and displays the preview image by use of the user interface 28. The preview display editing section 30 receives, via the user interface, instructions from the user to change pages, carry out editing, and so on the preview display window.

In response to the reception section 26 receiving the instruction for execution, the command generating section 23 generates a command for causing the image output device 10 to execute a selected output process in accordance with a received condition for the output process. A generated command is transmitted, together with the compatible format data, to a selected image output device 10.

The compatible format data generating section 21, the searching section 22, the command generating section 23, the disclosure section 25, the reception section 26, and the preview display editing section 30 constitute the control section 29. Though not shown in a drawing, the control section 29 is configured so that the CPU (i) executes a program stored in a ROM or a RAM and (ii) uses the RAM as a working area.

The communication section 24 transmits, via the network 5, (i) the compatible format data (the compatible format data may have been subjected, in the preview display editing section 30, to a process such as rearrangement of pages) generated by the compatible format data generating section 21 and (ii) the command generated by the command generating section 23, to the image output device 10 selected as the destination to which the compatible format data is transmitted. The compatible format data and the command can be transmitted by means of Line Printer daemon protocol (LPR), File Transfer Protocol (FTP) or the like.

The user interface 28 is constituted by a display device and instruction input devices such as a keyboard and a mouse.

The image output device 10 includes a communication section 11, a command analysis section 12, an image output processing section 13, a response section 16, a storage section 15, a user interface 14, and a printing engine 17.

The communication section 11 receives the compatible format data and the command transmitted from the information processing device 20. In a case where a transmission is instructed as an output process, the communication section 11 transmits image data to a specified destination.

The command analysis section 12 analyzes a received command so as to determine which one of the following functions is to be used as an output process of the image data: printing, facsimile transmission, Internet facsimile (I-Fax) transmission, e-mail transmission, FTP transmission, and the like. In a case where the output process is determined to be printing, the command analysis section 12 determines a print setting. In a case where the output process is determined to be any of the various output processes, the command analysis section 12 determines a destination setting and the like.

The image output processing section 13, carries out an output process with respect to the compatible format data, which has been received, in accordance with the setting determined by the command analysis section 12. In a case where the output process is determined to be printing, the image output processing section 13 supplies, to the printing engine 17, the compatible format data together with a condition for the print setting determined by the command analysis section 12. In a case where the output process is determined to be any of the facsimile transmission, the I-facsimile transmission, and the like, the image output processing section 13 (i) first converts the compatible format data into TIFF file data and (ii) then transmits, to the communication section 11, the TIFF file data together with the destination setting and the like. In a case where the output process is determined to be an e-mail transmission, an FTP transmission or the like, the image output processing section 13 transmits, to the communication section 11, the compatible format data together with the destination setting and the like, either (i) without making a change in format of the compatible format data or (ii) after converting the compatible format data into data in a specified data format if such a data format has been specified.

Upon receipt of an inquiry, via the communication section, from the searching section 22 in the information processing device 20 on the network 5, the response section 16 responds to the inquiry by reading out, from the storage section 15, the information on (a) a name and an IP address of the image output device 10 in which the response section 16 is provided and (b) the function(s) supported by the image output device 10.

The command analysis section 12, the image output processing section 13, and the response section 16 constitute the control section 19. Though not shown in a drawing, the control section 19 is configured so that the CPU (i) executes a program stored in a ROM or a RAM and (ii) uses the RAM as a working area.

The storage section 15 is a memory such as an HDD and stores at least information on the image output device 10 in which the storage section 15 is provided. Specifically, the storage section 15 stores at least information on the name, the IP address, and functions of the image output device 10.

The user interface 14 is constituted by a display device and an instruction input devices such as a keyboard and a mouse.

Figure 3:
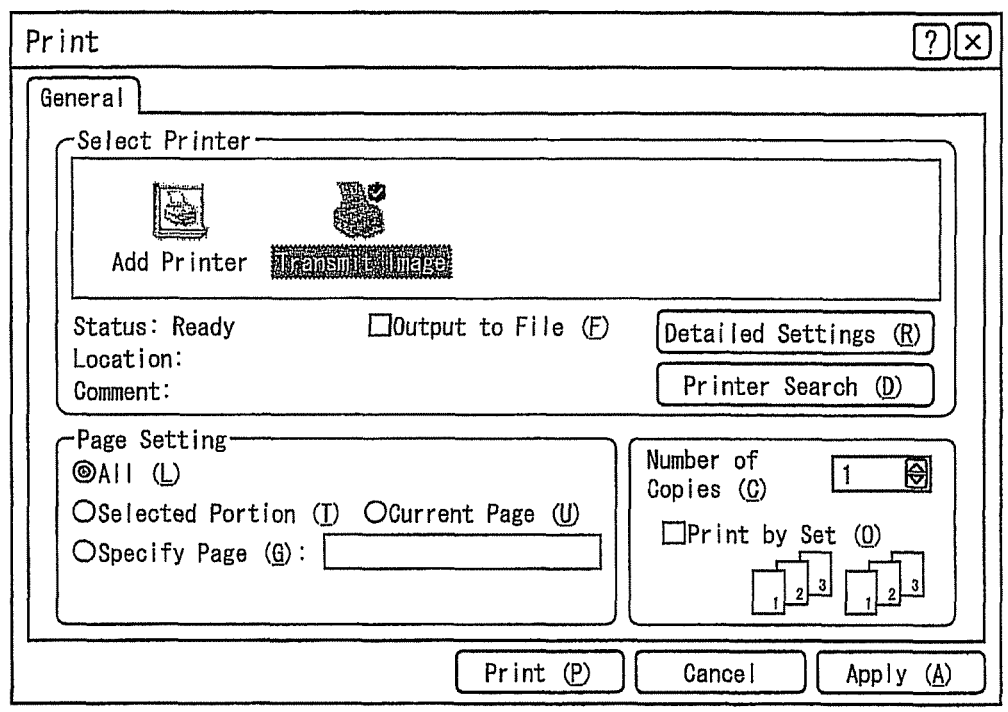
FIG. 3 is an explanatory view illustrating a setting window for printing in an application, the setting window being capable of activating a compatible format data generating section provided in the information processing device.

FIG. 3 illustrates a window for activating the compatible format data generating section 21 in the information processing device 20. The window is a print window opened by specifying 'print' in a given application. By selecting the 'transmit image' button in the 'select printer' box and clicking the 'print' button in the print window, it is possible to generate compatible format data of application data which had been activated when the print window was opened. Note that the information processing device 20 of the present embodiment is exemplified as an information processing device in which a display button is selected by being clicked by means of a mouse. The present embodiment is not limited to this. In case of an information processing device with a touch panel, a display button is selected by being pressed (i.e., touched).

Figure 4:
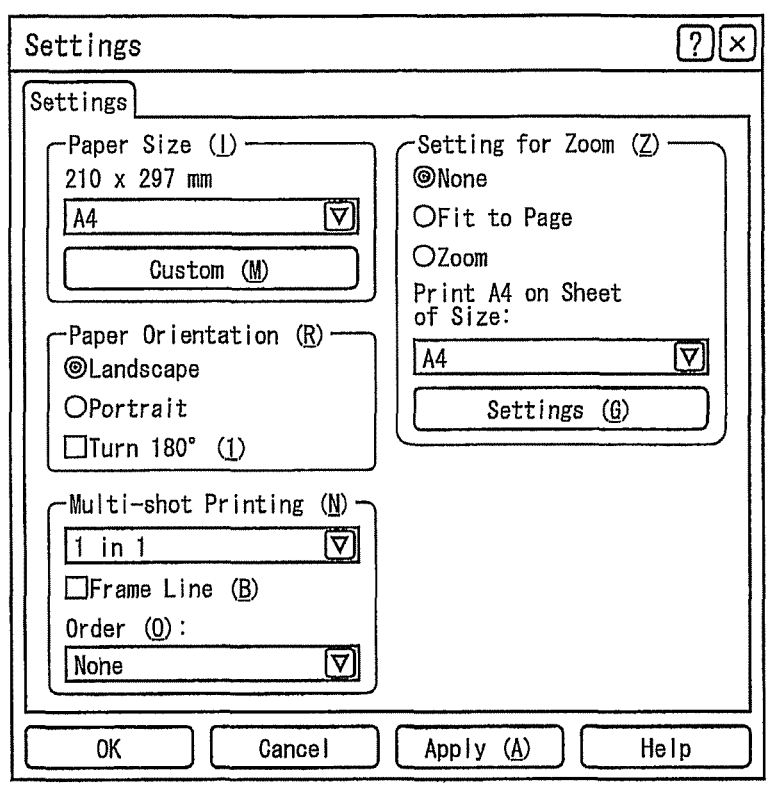
FIG. 4 is a setting window for detailed settings of the compatible format data generating section, the setting window being displayed by clicking a button 'detailed settings' on the setting window for printing illustrated in FIG. 3.

Clicking of the 'detailed settings' button in the window of FIG. 3 causes a dialogue box to be displayed as illustrated in FIG. 4. The dialogue box allows settings to be made for creation of the compatible format data. In the window of FIG. 4, it is possible to set paper size, paper orientation, multi-shot printing, and magnitude of zooming. Clicking of 'OK' in the window causes the settings to be enabled and allows the user to return to the window of FIG. 3.

In a case where the detailed settings are determined in the window of FIG. 4 so as to instruct to make a change from default settings, the compatible format data generating section 21 generates, in response to a clicking of the 'print' button of FIG. 3, the compatible format data on the basis of the detailed settings determined in the window illustrated in FIG. 4. For example, in a case where the 'multi-shot printing' is set to '2 in 1,' the compatible format data generating section 21 generates compatible format data which is to be printed out two pages per sheet.

The information processing device 20 is thus configured so that the compatible format data generating section 21 is activated from the window for printing out the application data, on the basis of which the compatible format data is generated.

A request for printing is generally made in a state where the application data has been opened. As such, it is possible to facilitate instruction by activating the compatible format data generating section 21 on the window for printing out the application data.

In addition, the window for printing out is an instruction window that is used more often than windows for instructing transmission and the like. As such, it is especially stress-reducing for an unskilled user to be able to select an output process, other than printing, on the window that the user is well used to.

Note that the present embodiment can employ a configuration in which the compatible format data is generated by (i) creating in advance an icon for the compatible format data generating section 21 and (ii) dragging and dropping, onto the icon, a file of the application data to be subjected to the output process, in stead of employing a configuration in which the compatible format data generating section 21 generates the compatible format data in a state in which an application has been activated.

This configuration is convenient for a skilled user, because the user can instruct creation of the compatible format data without running the application.

The searching section 22 in the information processing device 20 starts searching, on the network 5, for the image output device 10 capable of processing the compatible format, when (i) the 'print' button of FIG. 3 is clicked or (ii) the file of the application data to be subjected to the output process is dragged and dropped onto the icon of the compatible format data generating section 21.

FIG. 5 illustrates an example of a search result which is obtained as a result of the search carried out by the searching section 22 and is to be stored in the storage section 27. As early described, the searching section 22 (i) communicates with each image output device 10 of the plurality of the image output devices 10-1 through 10-$n$ on the network and (ii) determines, on the basis of a response from the response section 16 in the image output device 10, whether or not the image output device 10 is capable of processing the compatible format data.

It is possible to determine, on the basis of for example the name of the image output device 10, (i) whether or not the image output device 10 is capable of processing the compatible format data and (ii) what output process, other than printing, can be carried out by the image output device 10. In a case where the function(s) supported by the image output device 10 can be specified on the basis of the name of the image output device 10, it is possible to make the determination by holding information on the name and the function(s) such that the function(s) is(are) associated with the name.

For example, in a case where the searching section 22 uses an SNMP protocol, the searching section 22 refers to MIB data built in each of the image output devices 10-1 through 10-N. The SNMP protocol is a generally used protocol in which, when an ID (called an OID) is specified, a value set for the ID is returned, the value being contained in the MIB in the image output device 10. The image output devices 10-1 through 10-n have a shared ID that is defined as printer-related information. The shared ID allows obtaining of information such as a model name, an option name, a tray name, a paper size set for the tray. The searching section 22 can determine, on the basis of the model name and the option name thus obtained, a function in which the compatible format data can be processed. The MIB data is stored in the storage section 15 in the image output device 10. The response section 16 responds to a communication in which the SNMP protocol is used.

In the example of FIG. 5, the device name 'SHARP MX-3100FG,' for example, is associated with three functions 'print,' 'facsimile transmission,' and 'e-mail transmission,' which are stored as the output process function(s) (supported function(s)) in which the compatible format data can be used. In a case where (i) no option has been built in the image output device 10 or (ii) the image output device 10 does not have any output process function, other than printing, in which the compatible format data can be used, the name of the image output device 10 is associated only with the function 'print,' as in the case of the device name 'SHARP MX-M503N' of FIG. 5, which function 'print' is stored as information on the supported function(s).

FIG. 6 shows an example of a display window of the search result. The display window is displayed after the 'print' button of FIG. 3 is clicked. Note that FIG. 6 shows an example in which the preview display editing section 30 displays (i) the preview image of the compatible format data and (ii) the search result disclosed by the disclosure section 25.

The user of the information processing device 20 can check the compatible format data of the given application data in the preview image which is being displayed. The user can also carry out editing on the preview display window. For example, the user can change an order of pages of the compatible format data by rearranging images on the respective pages (P.1, P.2, and P.3) by use of a mouse or the like.

In the example illustrated in FIG. 6, the display window of the search result displays a list of, as information on image output devices 10 capable of processing the compatible format data, (i) icons representing outer appearances of the respective image output devices 10 and (ii) the names of and the IP addresses of the respective image output devices 10. The display window of the search result enables a selection of one of the image output devices 10 to which to transmit the compatible format data so as to cause the image output device 10 to carry out the process. In a case where the icon of an image output device 10 is clicked on the display window, the disclosure section 25 displays a popup menu for selecting a function. On the popup menu window, the information on the output process function(s), which can be carried out by the image output device 10 by use of the compatible format data, is displayed.

The example illustrated in FIG. 6 corresponds to a configuration in which (i) only the information on the image output devices 10 capable of processing the compatible format data is displayed in the list and (ii) the information on the function(s) that can be carried out by each of the image output device 10 is later displayed. Note that the present embodiment is not limited to the configuration and can of course employ a configuration in which the information on the output process function(s) available in each of the image output devices 10 is displayed on the display window of the search result, together with the information on the image output devices 10 capable of processing the compatible format data.

Note that, in a case where (i) a large number of image output devices 10 capable of processing the compatible format data are detected and (ii) a size of the display window does not allow all of the image output devices 10 to fit in the list to be displayed, it is also possible to employ a configuration in which a sign '▼,' which indicates that the next window is available, is displayed so as to allow all of the image output devices 10, which has been detected, to be displayed by scrolling the display window.

Figure 7:
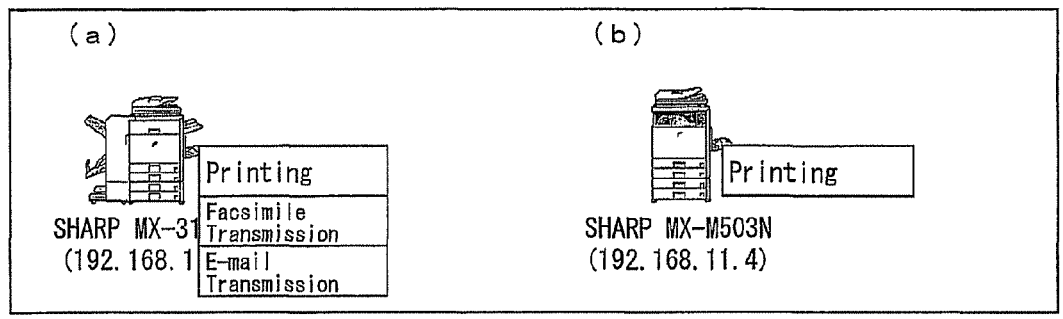
FIG. 7 is an explanatory view illustrating an example of popup menus which (i) are each displayed in response to a clicking of a portion of the display window of the search result illustrated in FIG. 6, in which portion a corresponding one of image output devices is displayed and (ii) makes it possible to select an output process from among output processes supported by the image output device.

FIG. 7 illustrates popup menus which enable a selection of a function. (a) of FIG. 7 is displayed when the user clicks the icon of the image output device 10 whose device name is 'SHARP MX-3100FG' on the display window of the search result of FIG. 6. (a) of FIG. 7 discloses to the user that 'print,' 'facsimile transmission,' or 'e-mail transmission' can be selected as the output process. The disclosure section 25 discloses such information on the basis of the search result stored in the storage section 27 (see FIG. 5).

(b) of FIG. 7 is displayed in response to the user clicking the icon of the image output device 10 whose device name is 'SHARP MX-M503N' in the display window of the search result of FIG. 6. (b) of FIG. 7 discloses to the user that only 'print' can be selected as the output process. The disclosure section 25 discloses such information on the basis of the search result stored in the storage section 27 (see FIG. 5).

In a case where, although not shown in FIG. 7, the icon of the image output device 10 having a device name 'SHARP MX-2310F' is clicked in the display window of the search result of FIG. 6, the disclosure section 25 discloses to the user, on the basis of the search result stored in the storage section 27 (see FIG. 5), that 'print' or 'e-mail transmission' can be selected as the output process.

In a case where the information obtained from an image output device 10, which is one out of the image output devices 10-1 through 10-N on the network 5 and is capable of processing the compatible format data, proves that such an image output device 10 has a function of converting PDF data into JPEG data and/or a function of converting PDF data into TIFF data, it is possible to employ the following configuration. According to the configuration, a format of data to be transmitted can be selected from 'PDF,' 'JPEG,' and 'TIFF,' in a case where 'e-mail transmission' is selected as the output process.

Figure 8:
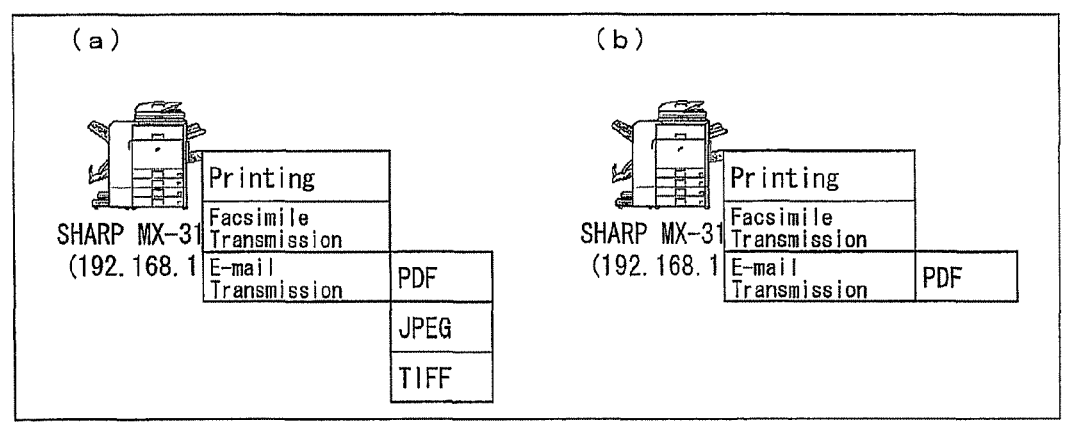
FIG. 8 is an explanatory view illustrating examples of a popup menu which (i) is displayed in response to a clicking of a portion of the display window of the search result illustrated in FIG. 6, in which portion a corresponding one of the image output devices displayed and (ii) makes it possible to further select a file format of data to be transmitted in a case where e-mail transmission is selected from output processes supported by the image output device.

FIG. 8 illustrates other popup menus that enable a selection of a function. (a) of FIG. 8 is a window that further enables, in 'e-mail transmission,' a selection of a format of data to be transmitted, from 'PDF,' 'JPEG,' and 'TIFF.' (b) of FIG. 8 is a window that causes the user, in 'e-mail transmission,' to understand that only 'PDF' is available as a format of data to be transmitted.

As described above, the disclosure section 25 of the information processing device 20 is configured so as to display (i) a list of the image output devices 10 capable processing the compatible format data and (ii) information on output process(es), which is(are) available in each of the image output devices 10, on the popup menu such that the information is associated with the each of the image output devices 10.

Thus, even in a case where (i) the display window of the search result is small and/or the image output devices 10 are detected in large numbers and (ii) further displaying, on the display window, of information on selectable output process(es) of each of the image output devices 10 causes a difficulty in recognition of what the display window displays, it is possible to achieve a recognizable display window by displaying the selectable output process(es) on the popup menu.

Though not shown in a drawing, the disclosure section 25 can be configured so as to display (i) a list of the names of the image output devices 10 capable of processing the compatible format data and (ii) a list of name(s) of the output process(es), which is(are) available in each of the image output devices 10, such that the name(s) of the output process(es) of each of the image output devices 10 is(are) associated with the each of the image output devices 10.

According to the configuration, (i) the list of the names of the image output devices 10 capable of processing the compatible format data is displayed and (ii) the list of the name(s) of the output process(es), which is(are) available in each of the image output devices 10, is(are) displayed such that the name(s) of the output process(es) of each of the image output devices 10 is(are) associated with the each of the image output devices 10. This allows the user to grasp, at first glance, available image output devices 10 and information on the output process function(s).

In response to the user clicking a desired function on the windows for selecting an output process function shown in FIGS. 7 and 8, the disclosure section 25 displays a corresponding dialogue box, as shown in FIG. 9, for setting a process method.

The dialogue box can be displayed such that (i) the dialogue box fits in the display window of the search result or (ii) the dialogue box bridges between the preview display window and the display window of the search result of FIG. 6.

(a) of FIG. 9 is a dialogue box for the print setting and is displayed in a case where printing is selected as a function. Via the dialog box, it is possible to select each of 'number of copies,' 'double-side printing,' 'multi-shot printing,' and 'color mode.' By clicking a button '▼' or '▲' located at one end of each of blocks for the 'number of copies,' the 'double-side printing,' the 'multi-shot printing,' and the 'color mode,' it is possible to select a target one from selectable conditions for each of the blocks.

In a case where, for example, the 'double-side printing' is selected, clicking of the button '▼' allows a setting of the 'double-side printing' to 'double-side printing' or 'single-side printing.'

In a case where the 'multi-shot printing' is selected, clicking of the button '▼' allows setting of the 'multi-shot printing' to, for example, '1 in 1,' '2 in 1,' '4 in 1,' or '8 in 1.' Note, however, that the setting of the 'multi-shot printing' is finally determined by (i) the setting made via the dialogue box, illustrated in FIG. 4, of the compatible format data generating section 21 and (ii) the setting made via the dialogue box illustrated in (a) of FIG. 9. For example, in a case where (i) the 'multi-shot printing' is set to '2 in 1' in the dialogue box of (a) of FIG. 9 and (ii) the 'multi-shot printing' is set to '2 in 1' in the dialogue box in the compatible format data generating section 21, printing actually carried out in the image output device 10 is 4-in-1 printing.

In a case where the 'color mode' is selected, clicking of the button '▼' allows setting of the 'color mode' to 'color' or 'monochrome.' In a case where the 'color' is selected, color printing is carried out. In a case where the 'monochrome' is selected, monochrome printing is carried out.

In a case where a button 'OK' is clicked on the window, the reception section 26 (i) receives (a) entered conditions for the print setting and (b) an instruction to execute printing, (ii) transmits them to the command generating section 23 so as to instruct the command generating section 23 to create a command, and (iii) instructs the communication section 24 to transmit, to the image output device 10 which has been selected, a created command and the compatible format data.

(b) of FIG. 9 is a dialogue box for facsimile transmission setting and is displayed in a case where facsimile transmission is selected as a function. Via the dialog box, it is possible to set 'facsimile number' and 'communicate speed.' The 'facsimile number' is entered by use of a keyboard (not shown) or the like. By clicking a button '▼' located at one end of a block for the 'communicate speed,' it is possible to select a target one from selectable conditions for the block.

In a case where a button 'OK' is clicked on the window, the reception section 26 (i) receives (a) entered conditions for the facsimile transmission setting and (b) an instruction to execute facsimile transmission, (ii) transmits them to the command generating section 23 so as to instruct the command generating section 23 to create a command, and (iii) instructs the communication section 24 to transmit, to the image output device 10 which has been selected, a created command and the compatible format data.

(c) of FIG. 9 is a dialogue box for e-mail transmission setting and is displayed in a case where e-mail transmission is selected as a function. Via the dialog box, 'e-mail address,' 'file format,' 'color mode,' and 'compression format' are set. The 'e-mail address' is entered by use of the keyboard (not shown) or the like. By clicking a button '▼' located at one end of each of blocks for the 'file format,' the 'color mode,' and the 'compression format,' it is possible to select a target one from selectable conditions for each of the blocks.

In a case where a button 'OK' is clicked on the window, the reception section 26 (i) receives (a) entered conditions for the e-mail transmission setting and (b) an instruction to execute e-mail transmission, (ii) transmits them to the command generating section 23 so as to instruct the command generating section 23 to create a command, and (iii) instructs the communication section 24 to transmit, to the image output device 10 which has been selected, a created command and the compatible format data.

(d) of FIG. 9 is a dialogue box for I-Fax (Internet facsimile) transmission setting and is displayed in a case where Internet facsimile transmission is selected as a function. Via the dialog box, 'e-mail address,' 'compression format,' and 'request for transmittal confirmation' are set. The 'e-mail address' is entered by use of the keyboard (not shown) or the like. By clicking a button '▼' located at one end of blocks for the 'compression format' and the 'request for transmittal confirmation,' it is possible to select a target one from selectable conditions for each of the blocks.

In a case where a button 'OK' is clicked on the window, the reception section 26 (i) receives (a) entered conditions for the Internet facsimile transmission setting and (b) an instruction to execute Internet facsimile transmission, (ii) transmits them to the command generating section 23 so as to instruct the command generating section 23 to create a command, and (iii) instructs the communication section 24 to transmit, to the image output device 10 which has been selected, a created command and the compatible format data.

Note that, in a case where, for example, it is determined, on the basis of the information obtained from the image output device 10, that the image output device 10 does not have a double-side printing function, by causing 'single-side printing' to be shown grayed out in the block for the 'double-side printing,' it is possible to prohibit a selection of the double-side printing even when clicking the button '▼' in the dialogue box for the print setting, as shown in (a) of FIG. 10.

In many of the image output devices 10 that have the double-side printing function, it is possible to specify whether to have sheets of printing paper side-stapled or top-stapled in double-side printing. In view of the circumstances, it is possible to have a configuration, as shown in (b) of FIG. 10, in which clicking of the button '▼'located at one end of the block for the 'double-side printing' shows three options 'single-side printing,' 'double-side printing (side-stapled),' and 'double-side printing (top-stapled),' one of which is to be selected by the user.

Note that, when clicking a button 'cancel' in each of the dialogue boxes of (a) through (d) of FIG. 9 and (a) and (b) of FIG. 10, the display window returns to the window with the popup menus, for selecting the output process, illustrated in (a) and (b) of FIG. 7 and (a) and (b) of FIG. 10.

FIG. 11 shows examples of the command to be generated by the command generating section 23 in the information processing device 20.

(a) of FIG. 11 shows an example of commands corresponding to a case in which printing is selected as a function. The commands are generated in a case where the button 'OK' is clicked in the dialogue box of (a) of FIG. 9 in a state where the dialogue box has been set as shown in (a) FIG. 9.

'TYPE=PRINT' indicates that the output process is printing. 'COPIES=1' indicates that a number of copies is one(1). 'DUPLEX=SIMPLEX' indicates single-side printing. 'NUP=2' indicates multi-shot printing (2 in 1). 'ORIENTATION=PORTRAIT' indicates vertical paper orientation, 'COLORMODE=COLOR' indicates color printing. Generated commands are put before '//compatible format data.'

(b) of FIG. 11 shows an example of commands corresponding to a case where facsimile transmission is selected as a function. The commands are generated in a case where the button 'OK' is clicked in the dialogue box of (b) of FIG. 9 in a state where the dialogue box has been set as shown in (b) FIG. 9.

'TYPE=FAX' indicates that the output process is facsimile transmission. 'FAXNUMBER=xxxx-xx-xxxx' indicates a telephone number of a destination to which the facsimile transmission is made. 'SPEED=336000' indicates a communicate speed. Generated commands are put before '//compatible format data.'

(c) of FIG. 11 shows an example of commands corresponding to a case where e-mail transmission is selected as a function. The commands are generated in a case where the button 'OK' is clicked in the dialogue box of (c) of FIG. 9 in a state where the dialogue box has been set as shown in (c) FIG. 9.

'TYPE=MAIL' indicates that the output process is e-mail transmission. 'MAILADDRESS=aaa@sharp.co.jp' indicates an e-mail address of a destination of the e-mail transmission. 'FILETYPE=PDF' indicates that the file format is PDF. 'COLORMODE=COLOR' indicates color mode. 'COMPRESSION=MIDDLE' indicates medium level compression. Generated commands are put before '//compatible format data.'

(d) of FIG. 11 shows an example of commands corresponding to a case where I-facsimile transmission is selected as a function. The commands are generated in a case where the button 'OK' is clicked in the dialogue box of (d) of FIG. 9 in a state where the dialogue box has been set as shown in (d) FIG. 9.

'TYPE=IFAX' indicates that the output process is I-facsimile transmission. 'MAILADDRESS=aaa@sharp.co.jp' indicates an email address of a destination to which the I-facsimile transmission is made. 'COMPRESSION=MMR' indicates that the compression format is MMR compression. 'RECEPTION=ON' indicates that transmittal confirmation is required. Generated commands are put before '//compatible format data.'

The command analysis section 12 which has received the compatible format data analyzes the commands put before '//compatible format data' so as to determine (i) a process to be carried out by the image output processing section 13 and (ii) print setting, address setting or the like.

Figure 12:
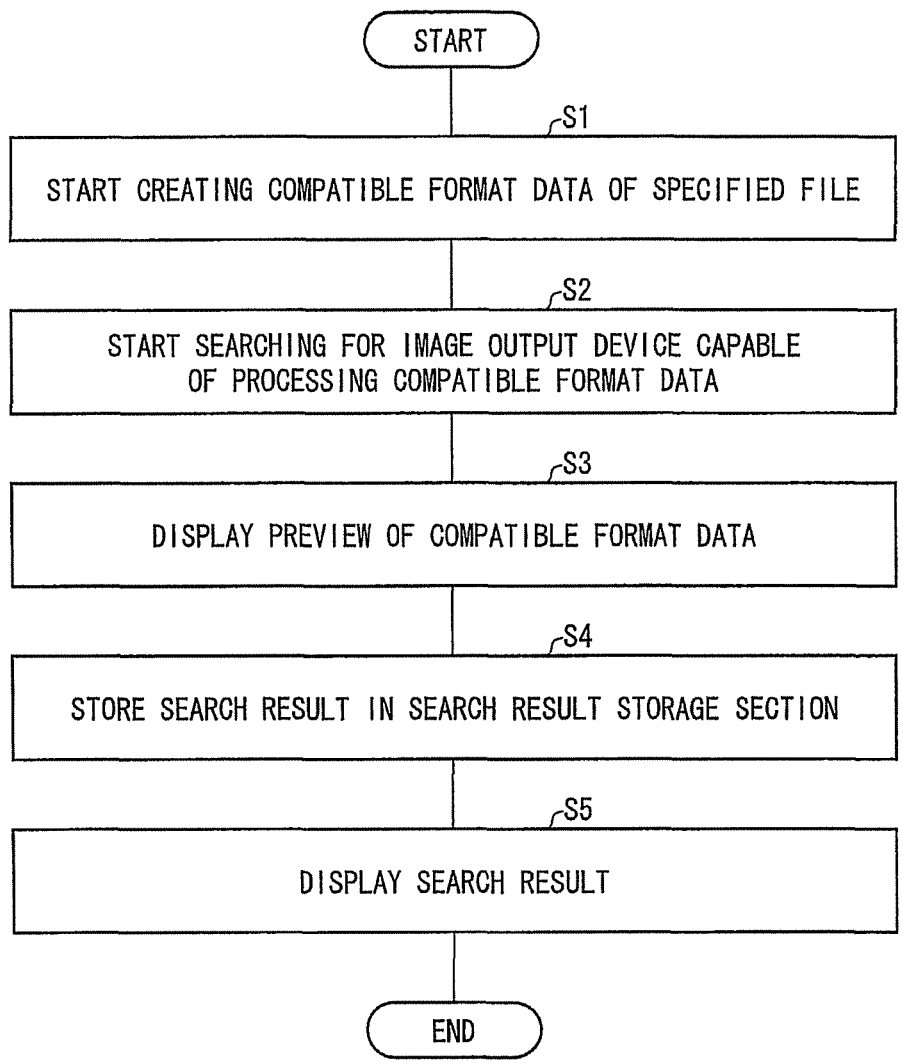
FIG. 12 is a flowchart showing a sequence of a process which is carried out when the user instructs to generate compatible format data in the information processing device. The process starts by generating of the compatible format data and end by displaying a search result.

The flowchart of FIG. 12 shows how the information processing device 20 processes when the user instructs to generate the compatible format data.

Upon detection of (i) a clicking of the button 'print' of the print window (see FIG. 3) in a state where the file of the application data has been opened or (ii) a dragging and dropping of the file of the application data, which is to be subjected to the output process, onto the icon for activating the compatible format data generating section 21, the compatible format data generating section 21 starts (S1) a process of generating the compatible format data of the application data.

In response to the compatible format data generating section 21 starting generating the compatible format data, the searching section 22 starts (S2) searching for an image output device capable of processing the compatible format data. Note that the search made by the searching section 22 can be started without waiting for completion of the process in S1.

The preview display editing section 30 starts (S3) preview displaying in which the preview image of the compatible format data is displayed on the user interface 28.

The searching section 22 causes the storage section 27 to store search result (S4), specifically, (i) the information on the image output device which has been detected through the search and (ii) the information on the output process function(s) in which the compatible format data can be used.

On the basis of the search result stored in the storage section 27, the disclosure section 25 displays the search result by use of the user interface 28 (S5). Note that the disclosure section 25 can start displaying the search result window without waiting for completion of the preview displaying in S3. The disclosure section 25 can also display search results in order of completion instead of displaying the search results all at once after completion of the search in the searching section 22.

Figure 13:
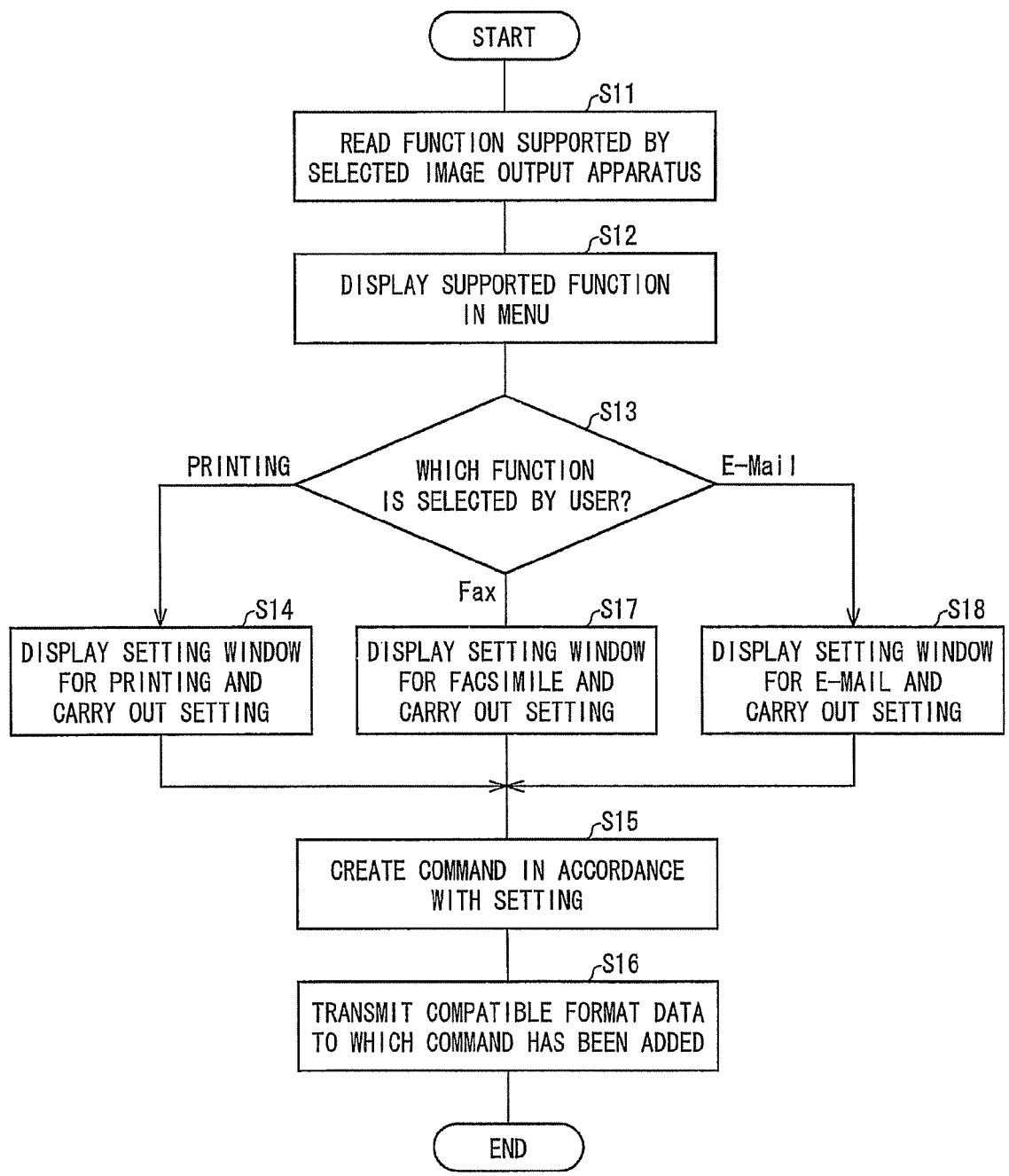
FIG. 13 is a flowchart showing a sequence of a process which is carried out when the user selects an image output device on the display window of the search result in the information processing device. The process starts by displaying, in a menu, selectable output processes and ends transmitting a compatible format data after-creating commands.

The flowchart of FIG. 13 shows how the information processing device 20 processes when the user selects the image output device 10 and the output process in the display window of the search result.

In a case where a clicking of the icon of one of the image output devices 10 is detected on the display window of the search result, which display window is displayed by the disclosure section 25 by use of the user interface 28, the disclosure section 25 (i) reads out, from the storage section 27, the output process function(s) which is(are) supported by the image output device 10 and in which the compatible format data can be used (S11), and (ii) displays, on the popup menu, the output process function(s) supported (S12). The flowchart of FIG. 13 corresponds to a case where it is possible to select any of three functions: printing, facsimile transmission, and e-mail transmission.

In a case where the user selects any one of the functions which have been displayed, the disclosure section 25 determines which function has been selected (S13). In a case where printing is selected, the disclosure section 25 displays the dialogue box for the print setting (see (a) of FIG. 9), so that the settings are received (S14). Alternatively, in a case where facsimile transmission is selected, the disclosure section 25 displays the dialogue box for the facsimile transmission setting (see (b) of FIG. 9), so that the settings are received (S17). Likewise, in a case where e-mail transmission is selected, the disclosure section 25 displays the dialogue box for the e-mail transmission setting (see (c) of FIG. 9), so that the settings are received (S18).

When setting is completed in each of S14, S17, and S18 for the respective functions selected, that is, when the button 'OK' is clicked on each of the dialogue boxes of (a) through (c) of FIG. 9, the reception section 26 (i) receives the settings, (ii) determines that an instruction for execution has been given, and (iii) transmits the settings to the command generating section 23, and the command generating section 23 generates a command in accordance with the settings (S15). When the command is generated, the communication section 24 transmits, to a selected image output device 10, the compatible format data to which the command has been added.

According to the configuration of the information processing device 20 as described above, when the compatible format data generating section 21 starts generating the compatible format data of the application data, the searching section 22 searches for the image output device 10 which is capable of printing out the compatible format data, from the image output devices 10-1 through 10-n which are connected to the network 5. The disclosure section 25 discloses, to the user, the search result via the user interface 28.

Then, the reception section 26 receives from the user, via the user interface 28, (i) the selection of an image output device 10 to which the compatible format data is to be transmitted, (ii) the input of the conditions for printing, and (iii) the instruction for execution. The command generating section 23 generates the command in accordance with the user's instruction and the like received by the reception section 26. A generated command is added to the compatible format data. The communication section 24 transmits, to the selected image output device 10, the compatible format data to which the command has been added. This causes printing of the compatible format data to be executed.

According to the configuration, when the user wants to print out application data, a mere instruction from the user to convert the application data into the compatible format data causes the image output devices 10, which are located close to the user and capable of printing out the compatible format data, to be detected through search and displayed to the user via the user interface 28. As such, just by, on the basis of displayed information, (i) selecting the image output device 10 to use, out of the image output devices 10, (ii) inputting conditions for printing, and (iii) giving an instruction to execute printing, the user can obtain a printed material of the compatible format data from the image output device 10, which is present near a location at which the user has given the instruction for printing.

This allows a user who carries his information processing device, such as a mobile PC, with him to (i) find out easily an image output device which is provided at an Internet café, a convenience store, a conference facility, an accommodation facility, or the like in town and (ii) cause the image output device to execute printing, even if he does not know presence of such an image output device.

In a case of a user at an office where a plurality of image output devices are provided, the user can (i) easily find out an image output device which has been newly provided and whose printer driver has not been installed and (ii) cause the image output device to execute printing, even if he does not know presence of such an image output device.

According to a more preferable configuration of the information processing device 20 of the present embodiment, (i) the searching section 22 obtains information on an output process which is other than printing and in which the compatible format data can be used in the image output device 10 capable of printing out the compatible format data and (ii) the disclosure section 26 further discloses the output process other than printing, by use of the user interface 28, (iii) the reception section 26 receives (a) a selection of an output process other than printing, (b) input of a condition for the output process, and (c) an instruction for execution, and (iv) the command generating section 23 generates a command in accordance with the user's instruction and the like received by the reception section 26.

The configuration allows information on an output process function to be disclosed as well in a case where the output process other than printing is possible. Therefore, in a case where the user, who wants to print out the application data, has instructed to convert the application data into the compatible format data, he can easily change to an output process other than printing, without starting all over again from the start.

In addition, when changing the output process from printing to transmission, it is possible to reduce consumption of paper and toner, so that $CO_2$ emission can be reduced. Therefore, the configuration, in which the user is informed of the fact that the output process other than printing can be selected, encourages the user to be environmentally conscious.

The present embodiment has described the information processing device 20. Note that the present embodiment is not limited to this, and therefore can be applied to an image output assisting device for use in an image output system in which an information processing device, which has a data generation function for generating the compatible format data of the application data which has been created on the basis of an application program, supplies created compatible format data to an image output device which is connected to the information processing device via the network and is capable of at least printing out the compatible format data.

The image output assisting device is different from the information processing device 20 in that the image output assisting device does not include the compatible format data generating section 21 which is provided in the information processing device 20. Another difference between the image output assisting device and the information processing device 20 is that the image output assisting device includes a communication section which transmits a created command to the information processing device 20 including the compatible format data generating section, instead of the communication section which (a) is provided in the information processing device 20 and (b) transmits the compatible format data, to which the command has been added, to the image output device. The communication section in the image output assisting device communicates with the communication section in the information processing device, which has a function of converting given application data into compatible format data, so as to receive (a) displaying and editing of the preview image of the compatible format data and (b) setting of the compatible format data and the like. The communication section in the image output assisting device creates a command in accordance with (a) the image output device and the output process selected by the user and (b) conditions set by the user, and then transmits the command to the information processing device. The information processing device adds the command, which has been created in the image output assisting device, to the compatible format data, which has been created by the compatible format data generating section provided in the information processing device, and then transmits the compatible format data, to which the command has been added, to a selected image output device.

As early described in the description of the configuration of the information processing device 20, the image output assisting device has a configuration in which the image output assisting device finds out, in response to an instruction to generate the compatible format data, an image output device capable of printing out the compatible format data and informs the user of the information processing device. This allows the user to (i) select the image output device and input a condition for printing or (ii) select an output process and input a condition for a selected output process and an instruction for execution. The image output assisting device thus assists image output in the image output system, in which conversion of application data into the compatible format data allows the compatible format data to be printed out by even an image output device whose printer driver has not been installed. As such, the image output assisting device makes it possible for the user to make efficient use of the image output system.

Note that the information processing device and the image output assisting device can be realized by use of a computer. In this case, (i) a program for causing the computer to operate as each section (means) of the devices so as to realize the information processing device and the image output assisting device by use of the computer and (ii) a computer-readable recording medium in which the program is recorded, are also included in the scope of the present invention computer.

That is, in the embodiment, the sections (means) provided in the information processing device 20 and the image output assisting device can be realized by means of software by use of a processor such as a CPU. In this case, the information processing device 20 and the image output assisting device each includes a CPU (Central Processing Unit) for executing commands of a control program for implementing each function, a ROM (Read Only Memory) in which the program is stored, a RAM (Random Access Memory) on which the program is loaded, a storage device (recording medium), such as a memory, in which the program and various data are stored, and the like.

An object of the present invention is attained by the following procedures (i) and (ii): (i) loading, to each of the information processing device 20 and the image output assisting device, the recording medium, in which program code (an executable program, an intermediate code program, and a source program) of the control program (software for implementing the functions) of each of the information processing device 20 and the image output assisting device is recorded so as to be read out by a computer and (ii) causing the computer (or a CPU or an MPU) to read out and execute the program code recorded in the recording medium.

For example, a tape such as a magnetic tape or a cassette tape, a disk including (i) a magnetic disk such as a Floppy® disk or a hard disk and (ii) an optical disk such as a CD-ROM, an MO, an MD, a DVD, or a CD-R, a card such as an IC card (including a memory card) or an optical card, a semiconductor memory such as a mask ROM, an EPROM, an EEPROM, or a flash ROM or the like can be used as the recording medium.

Further note that the information processing device 20 and the image output assisting device can be configured so as to be capable of being connected to a communications network via which the program code is loaded to the information processing device 20 and the image output assisting device. The communications network is not limited to a specific one. The communications network can be, for example, an internet, an intranet, an extranet, a LAN, an ISDN, a VAN, a CATV communications network, a virtual private network, a telephone network, a mobile telecommunications network, a satellite communication network or the like. A transmission medium that constitutes the communications network is not limited to a specific one. The examples of the transmission medium encompass (i) wired communications such as IEEE1394, USB, a power-line carrier, a CATV line, a telephone line, or ADSL and (ii) wireless communications such as infrared communication by means of IrDA or remote control, Bluetooth®, 802.11 wireless, HDR, a mobile phone network, a satellite circuit, or a terrestrial digital network. Note that the present invention can be realized also by means of a computer data signal embedded in a carrier wave, which computer data signal is obtained by embodying the program code in electronic transmission.

Note that sections (means) in the information processing device 20 and the image output assisting device are not limited to ones that can be realized by means of software but can be configured as a hardware logic or a combination of hardware that partially carries out a process and arithmetic means that executes software for controlling the hardware or carrying out the rest of the process.

As described above, an information processing device in accordance with the present invention includes: a data generating section for generating compatible format data of application data that is generated on the basis of an application program; a searching section for searching, when the data generating section starts generating the compatible format data, for at least one image output device connected to a network and capable of printing out the compatible format data; a disclosing section for disclosing, to the user via a user interface, the at least one image output device, which has been searched by the searching section; a receiving section for receiving, from the user via the user interface, (i) a selection of an image output device, out of the at least one image output device, to which the compatible format data is transmitted, (ii) input of a condition for printing, and (iii) an instruction for execution; and a command generating section for generating, when the receiving section receives the instruction for execution, a command for causing the printing to be executed in accordance with a received condition for the printing.

This allows a user who carries the information processing device with him to (i) find out easily an image output device which is provided at an Internet café, a convenience store, a conference facility, an accommodation facility, or the like in town and (ii) cause the image output device to execute printing, even if he does not know presence of such an image output device.

In a case of a user at an office where a plurality of image output devices are provided, the user can (i) easily find out an image output device which has been newly provided and whose printer driver has not been installed and (ii) cause the image output device to execute printing, even if he does not know presence of such an image output device.

This makes it possible to provide an information processing device which can assist the image output system, in which conversion of data into the compatible format data allows the compatible format data to be printed out by even an image output device whose printer driver has not been installed, so that the user can make efficient use of the image output system.

The information processing device in accordance with the present embodiment preferably employs a configuration in which (i) the searching section further obtains, when the searching of the at least one image output device capable of printing out the compatible format data is carried out, information on at least one output process which is other than printing and in which the compatible format data can be used, (ii) the disclosing section further discloses, to the user via a user interface, obtained information on the at least one output process which is other than printing, (iii) the receiving section receives, from the user via the user interface, (a) a selection of an output process other than printing out of the at least one output process, (b) input of a condition for the output process, and (c) an instruction for execution, and (iv) the command generating section generates, when the receiving section receives the instruction for the execution, a command for causing a selected output process to be executed in accordance with a received condition for the output process.

According to the configuration, the searching section further obtains the information on the output process, which is other than printing and in which the compatible format data can be used, in the image output device capable of printing out the compatible format data. The disclosing section discloses output processes other than printing, via the user interface. Then, the receiving section receives, (i) the selection of the output process other than printing, (ii) the input of the condition for the output process, and (iii) the instruction for execution. The command generating section generates a command in accordance with the user's instruction and the like received by the receiving section.

That is, according to the configuration, information on an output process function is disclosed as well in a case where the output process other than printing is possible. Therefore, in a case where the user who wants to print out the application data instructs to convert the application data into the compatible format data, he can easily change to an output process other than printing, without starting all over again from the start.

In addition, when changing the output process from printing to transmission, it is possible to reduce consumption of paper and toner, so that $CO_2$ emission can be reduced. Therefore, the configuration, in which the user is informed of the fact that the output process other than printing can be selected, encourages the user to be environmentally conscious.

The information processing device in accordance with the present invention can employ a configuration in which the disclosing section (i) displays a list of a name of the at least one image output device and (ii) displays information on each of the at least one output process, which can be used in a corresponding one of the at least one image output device, the information being displayed in a popup menu in association with the corresponding one of the at least one image output device.

Thus, even in a case where (i) the display window of the search result is small and/or the image output devices are detected in large numbers and (ii) further displaying, on the display window, of information on selectable output process(es) of each of the image output devices causes a difficulty in recognition of what the display window displays, it is possible to achieve a recognizable display window by displaying the selectable output process(es) on the popup menu.

The information processing device in accordance with the present invention can employ a configuration in which the disclosing section displays (i) a list of a name of the at least one image output device and (ii) a list of a name of each of the at least one output process that can be used in a corresponding one of the at least one image output device such that the name of the output process is associated with the corresponding one of the at least one image output device.

According to the configuration, (i) the list of the names of the image output devices capable of processing the compatible format data is displayed and (ii) the list of the names of the output process(es), which is(are) available in each of the image output devices, is(are) displayed such that the name(s) of the output process(es) of each of the image output devices is(are) associated with the each of the image output devices. This allows the user to grasp, at first glance, available image output devices and information on the output process function(s).

The information processing device in accordance with the present invention preferably employs a configuration in which the data generating section can be activated on a window for printing out the application data, the compatible format data of which is to be created.

A request for printing is generally made in a state where the application data has been opened. As such, it is possible to facilitate instruction by activating the data generating section on the window for printing out the application data.

In addition, the window for printing out is an instruction window that is used more often than windows for instructing transmission and the like. As such, it is especially stress-reducing for an unskilled user to be able to select an output process, other than printing, on the window that the user is well used to.

It is also preferable that the information processing device in accordance with the present invention employ a configuration in which the data generating section is activated by dragging and dropping a file of the application data, the compatible format data of which is to be generated, onto an icon for activating the data generating section.

This configuration is convenient for a skilled user, because the user can instruct creation of the compatible format data without running the application.

The information processing device in accordance with the present invention preferably can employ a configuration in which (i) the at least one output process is an e-mail transmission, and (ii) the searching section further obtains information on a file format that can be used in the e-mail transmission.

In the e-mail transmission, it is possible to transmit data in a file format other than the compatible format. As such, by further obtaining the information on whether or not the compatible format data can be converted into data in another file format, it is possible to have a wider range of options in the e-mail transmission.

The information processing device in accordance with the present invention preferably can further include a preview displaying section for displaying a preview image of the compatible format data.

In this case, the information processing device in accordance with the present invention preferably can further include an editing section for enabling of the user to edit the compatible format data by operating, via the user interface, the preview image which has been displayed.

Displaying the preview image of the compatible format data makes it possible to check content of the compatible format data. Having the editing section enables editing, such as rearranging pages, on the preview display window. This improves convenience.

The image output system in accordance with the present invention includes (i) the information processing device of the present invention and (ii) the image output device which is connected to the information processing device via the network and is capable of at least printing out the compatible format data.

As early described in the description of the configuration of the information processing device, the image output system including the information processing device in accordance with the present invention has a configuration in which the information processing device not only generates the compatible format data but also (i) finds out an image output device capable of printing out the compatible format data and (ii) informs the user of the information processing device. This allows the user to (a) select the image output device and input a condition for printing or (b) select an output process and input a condition for a selected output process and an instruction for execution. Thus, it becomes possible for the user to make more efficient use of the image output system, in which conversion of data into the compatible format data allows the compatible format data to be printed out by even an image output device whose printer driver has not been installed.

In an image output assisting device for an image output system in accordance with the present invention, an information processing device, which includes a data generating section for generating compatible format data of application data generated on the basis of an application program, transmits the compatible format data to an image output device which is connected to the information processing device via a network and is capable of at least printing out the compatible format data, said image output assisting device including: a searching section for searching, when the data generating section starts generating the compatible format data, for at least one image output device connected to a network and capable of printing out the compatible format data; a disclosing section for disclosing, to a user via a user interface, the at least one image output device, which has been searched by the searching section; a receiving section for receiving, from the user via the user interface, (i) a selection of an image output device, out of the at least one image output device, to which the compatible format data is transmitted, (ii) input of a condition for printing, and (iii) an instruction for execution; and a command generating section for generating, when the receiving section receives the instruction for execution, a command for causing the printing to be executed in accordance with a received condition for the printing.

The image output assisting device for the image output system in accordance with the present invention preferably employs a configuration in which (i) the searching section further obtains, when the searching of the at least one image output device capable of printing out the compatible format data is carried out, information on at least one output process which is other than printing and in which the compatible format data can be used, (ii) the disclosing section further discloses, to the user via the user interface, obtained information on the at least one output process which is other than printing, (iii) the receiving section receives, from the user via the user interface, (a) a selection of an output process other than printing out of the at least one output process, (b) input of a condition for the output process, and (c) an instruction for execution, and (iv) the command generating section generates, when the receiving section receives the instruction for the execution, a command for causing a selected output process to be executed in accordance with a received condition for the output process.

As early described in the description of the configuration of the information processing device, the image output assisting device in accordance with the present invention has a configuration in which the image output assisting device (i) finds out, in response to an instruction to generate the compatible format data, an image output device capable of printing out the compatible format data and (ii) informs the user of the information processing device. This allows the user to (a) select the image output device and input a condition for printing or (b) select an output process and input a condition for a selected output process and an instruction for execution. The image output assisting device thus assists image output in an image output system, in which conversion of application data into the compatible format data allows the compatible format data to be printed out by even an image output device whose printer driver has not been installed. As such, the image output assisting device makes it possible for the user to make efficient use of the image output system.

The present invention is not limited to the above-described embodiments but allows various modifications within the scope of the claims. That is, any embodiment derived from a combination of technical means appropriately modified within the scope of the claims will also be included in the technical scope of the present invention.

INDUSTRIAL APPLICABILITY

The present invention relates to an information processing device and an image output assisting device which assist an image output system in which given application data is used by being converted into compatible format data. The present invention allows printing, data transmission and the like to be easily carried out by use of an image output device whose printer driver has not been installed. Therefore, the present invention allows image data in a mobile PC to be used in an output processing system or the like by use of an image output device provided at an Internet café, a convenience store, a conference facility, an accommodation facility, and a public facility such as a station.

REFERENCE SIGNS LIST

5: network
10: image output device
11: communication section
12: command analysis section
13: image output processing section
14: user interface
15: storage section
16: response section
17: printing engine
19: control section
20: information processing device
21: compatible format data generating section
22: searching section
23: command generating section
24: communication section
25: disclosure section
26: reception section
27: storage section
28: user interface
30: preview display editing section
X: image output system

The invention claimed is:
1. An information processing device comprising:
a data generating section for generating compatible format data of application data that is generated on the basis of an application program;
a searching section for searching, when the data generating section is instructed to generate the compatible format data, for at least one image output device connected to a network and capable of printing out the compatible format data, wherein the compatible format data of the application data is printable even by an image output device whose printer driver has not been installed in the information processing device, wherein the searching section further obtains, when the searching of the at least one image output device capable of printing out the compatible format data is carried out, information on at least one output process which is other than printing and in which the compatible format data can be used;

a disclosing section for disclosing the at least one image output device, which has been searched by the searching section, wherein the disclosing section further discloses the obtained information on the at least one output process which is other than printing;

a receiving section for receiving (i) a selection of an image output device, out of the at least one image output device, to which the compatible format data is transmitted, (ii) input of a condition for printing, and (iii) an instruction for execution, wherein the receiving section further receives (a) a selection of an output process other than printing out of the at least one output process, (b) input of a condition for the output process, and (c) an instruction for execution; and a command generating section for generating, when the receiving section receives the instruction for execution, a command for causing the printing to be executed in accordance with the received condition for the printing, wherein the command generating section further generates, when the receiving section receives the instruction for the execution, a command for causing a selected output process to be executed in accordance with the received condition for the output process.

2. An image output system comprising:

an information processing device, and an image output device which is connected to the information processing device and is capable of at least printing out compatible format data, said information processing device including:

a data generating section for generating compatible format data of application data that is generated on the basis of an application program, wherein the compatible format data of the application data is printable even by an image output device whose printer driver has not been installed in the information processing device;

a searching section for searching, when the data generating section is instructed to generate the compatible format data, for at least one image output device connected to a network and capable of printing out the compatible format data, wherein the searching section further obtains, when the searching of the at least one image output device capable of printing out the compatible format data is carried out, information on at least one output process which is other than printing and in which the compatible format data can be used;

a disclosing section for disclosing the at least one image output device, which has been searched by the searching section, wherein the disclosing section further discloses the obtained information on the at least one output process which is other than printing;

a receiving section for receiving (i) a selection of an image output device, out of the at least one image output device, to which the compatible format data is transmitted, (ii) input of a condition for printing, and (iii) an instruction for execution, wherein the receiving section further receives (a) a selection of an output process other than printing out of the at least one output process, (b) input of a condition for the output process, and (c) an instruction for execution;

and a command generating section for generating, when the receiving section receives the instruction for execution, a command for causing the printing to be executed in accordance with the received condition for the printing, wherein the command generating section further generates, when the receiving section receives the instruction for the execution, a command for causing a selected output process to be executed in accordance with the received condition for the output process.

3. A non-transitory computer-readable recording medium in which a program for (i) causing an information processing device recited in claim 1 to operate and (ii) causing a computer to function as each section of the information processing device is recorded.

4. An image output assisting device for use in an image output system in which an information processing device, which includes a data generating section for generating compatible format data of application data generated on the basis of an application program, transmits the compatible format data to an image output device which is connected to the information processing device via a network and is capable of at least printing out the compatible format data, wherein the compatible format data of the application data is printable even by an image output device whose printer driver has not been installed in the information processing device, said image output assisting device comprising:

a searching section for searching, when the data generating section is instructed to generate the compatible format data, for at least one image output device connected to the network and capable of printing out the compatible format data, wherein the searching section further obtains, when the searching of the at least one image output device capable of printing out the compatible format data is carried out, information on at least one output process which is other than printing and in which the compatible format data can be used;

a disclosing section for disclosing the at least one image output device, which has been searched by the searching section, wherein the disclosing section further discloses the obtained information on the at least one output process which is other than printing;

a receiving section for receiving (i) a selection of an image output device, out of the at least one image output device, to which the compatible format data is transmitted, (ii) input of a condition for printing, and (iii) an instruction for execution, wherein the receiving section further receives (a) a selection of an output process other than printing out of the at least one output process, (b) input of a condition for the output process, and (c) an instruction for execution; and a command generating section for generating, when the receiving section receives the instruction for execution, a command for causing the printing to be executed in accordance with the received condition for the printing, wherein the command generating section further generates, when the receiving section receives the instruction for the execution, a command for causing a selected output process to be executed in accordance with the received condition for the output process.

* * * * *